April 25, 1944. D. R. ZUCK 2,347,230
AIRPLANE WITH NONSTALLING AND GLIDE ANGLE CONTROL CHARACTERISTICS
Filed Dec. 16, 1938  4 Sheets-Sheet 4

Patented Apr. 25, 1944

2,347,230

UNITED STATES PATENT OFFICE 2,347,230

AIRPLANE WITH NONSTALLING AND GLIDE ANGLE CONTROL CHARACTERISTICS

Daniel R. Zuck, San Diego, Calif.

Application December 16, 1938, Serial No. 246,153

13 Claims. (Cl. 244—82)

This invention relates to aircraft, the improvement of flying and taxiing characteristics.

The primary object of this invention is to provide an airplane with greater inherent safety for the novice and the amateur flyer. Included in this object is the purpose of providing an airplane which shall be impossible to stall, to spin, to dive excessively, or to intentionally, or unintentionally perform any other maneuver which will induce a stall, a vicious spin, or an excessive dive, thereby curbing the perilous nature of an airplane as a common carrier in private air transportation.

Another object is to provide an airplane capable of controlled descent at any given speed within the speed range of the airplane. The speed range of an airplane is described as the range existing between the maximum speed that can be attained in level flight and the minimum speed at which flight in a horizontal path can be maintained.

Another object is to provide perfect and uninterrupted control of the airplane in all circumstances regardless of the speed or the attitude of the airplane with respect to the relative wind. The relative wind may be described as the wind which strikes the airplane in a direction parallel to the path of flight. The direction of the relative wind cannot necessarily be determined from the attitude of the airplane with respect to the ground level. When an airplane wing is longitudinally parallel to the relative wind no angle of attack is said to exist. When an airplane wing is projected at an angle to the relative wind an angle of attack is then said to exist.

Another object is to provide an airplane capable of navigating with greater control and stability on the ground in taxiing to and from the takeoff runway; to be capable of taxiing in strong cross-winds with carefree abandon without realizing the peril of nosing over, ground-looping, or any other common hazards which are realized by an airplane with an inherent lack of stability and control, and which are commonly associated with the conventional airplane while on the ground.

An airplane to maintain controlled flight must be steerable and stable about three axes. These three axes are known as: the vertical axis which passes through the center of gravity of the airplane and is the pivotal axis about which movement or yawing takes place, the longitudinal axis which passes from the front to the rear through the fuselage and is the axis about which rolling movement takes place, the lateral axis which extends from wing tip to wing tip and normal to the plane of symmetry and is the axis about which longitudinal pitching takes place, governing the ascent and descent of the airplane.

In the past airplanes have usually been controlled directionally about a vertical axis by means of a rudder disposed vertically on the tail of the airplane located usually far behind the center of gravity, and laterally about a longitudinal axis by means of ailerons located near the tips of the wings, and longitudinally about a lateral axis by means of an elevator attached to the tail of the aircraft and normal to the plane of the rudder. I propose to divorce the usual function of control of yawing and pitching motion from the vertical and horizontal tail surfaces respectively, permitting them to retain a function of indirect importance, namely that of stabilizing the pitching and yawing movement of the fuselage with respect to the path of flight, by means of swingably mounting the wings on a lateral axis having the center of pressure of the air forces slightly to the rear of said lateral axis, and equalizing the unbalanced moment created by said center of pressure of air forces to the rear of said lateral axis by means of servo-action created by an auxiliary control surface preferably integrally mounted within the plan form of the wing, and said control surface being directly controlled by the pilot for the purpose of governing all possible attitudes and all possible directions of the flight of the airplane.

It is recognized that earlier patentees disclosed fore and aft tilting of the wings for longitudinal control or control of ascent and descent, and differential tilting of the wings for lateral or rolling movement control. Heretofore these patentees have failed to disclose, or contemplate in their disclosure, the essential elements in whole or in part which give the aircraft properties to sustain safe and unstalled flight in all possible circumstances. While an earlier patentee disclosed in Patent Number 1,945,520 provisions for trimming the longitudinal attitude of the wings with respect to the lateral axis for hands-off flight in a straight path by means of an auxiliary control surface placed at a distance arrears of the trailing edge of the wing, all rolling movement control about the longitudinal axis and pitching movement control of the wings about a lateral axis is obtained by direct manual control by means of a freely movable control mechanism connected to the wings proper. This is little, if any, improvement over the conventional airplane, for the airplane constructed in accordance with above said patent is permitted to retain all the old vices of the conventional airplane, that of being wilfully or unwilfully stalled and spun. Neither have earlier patentees disclosed any contemplation or means of locating the center of gravity of the wing plus the weight of the control surface on or near the lateral axis about which the wing is designed to rotate within a limiting range. Locating the center of gravity in accordance with the above description is an important feature of the following described invention.

In my invention I propose to support the wings independently of each other to the fuselage with freedom of fore and aft tilting about a lateral axis with no direct manual or mechanical control to the wings; control of said wings shall be obtained by means of servo-action of a movable portion of the trailing edge, or a movable control surface, or a movable airfoil mounted within the trailing edge as an integral part of the plan form of the wing. I also propose to mount the wings to the fuselage with a certain amount of dihedral angle with respect to each other, or to mount said wings to the fuselage with a certain amount of gull-wing effect in each individual wing as an integral form built into the wing spanwise on a plane parallel to the vertical axis of the airplane; with wings which are designed to tilt fore and aft as above described said dihedral or said gull-wing effect have the peculiar properties of controlling the direction of flight in a horizontal plane as well as in a vertical plane, thereby eliminating the necessity of a swingably attached rudder and a swingably attached elevator on the tail which in the conventional airplane control the path of flight in a horizontal and vertical plane respectively, with movement in said respective planes normally designated as yawing and pitching.

With the direct function of the tail for yawing and pitching control thus eliminated, the remaining function of the tail as a stabilizer for the body or fuselage, both longitudinally and directionally with respect to the path of flight, is of indirect importance in controlling the path of flight, it is therefore possible to further increase the merits of my invention by providing the tail surfaces with properties to subject the airplane to a decelerating or drag increasing influence, or what might more aptly be termed a glide angle control or regulator; to function in this respect the tail surfaces disposed vertically and horizontally may retain their normal shape and outline and appearance except they need not be broken into two sections as: the fixedly mounted fin and the swingably attached rudder thereto for the vertically disposed tail surfaces, and the fixedly mounted horizontally disposed stabilizer and thereto swingably attached elevators for the horizontal tail surfaces, but the entire vertical surface may be mounted as a fin and the entire horizontal surface as a stabilizer. To the horizontal stabilizer and the vertical fin may then be mounted split flaps which when closed conform as an integral part of the plan-form of the tail surface, and when operated to the open position create an artificial resistance or drag opposed to the forward motion of the airplane, and when opened suddenly will have a temporary decelerating influence on the forward motion of the aircraft until a steeper angle of glide can be assumed, at which time the aircraft will again maintain its original speed; a freely movable manually operated control will facilitate the operation of said flaps by the pilot, thereby making controlled angle of descent at any one given speed possible.

Sudden and indiscreet application of a severe retarding or decelerating influence such as the above and hereinafter described would induce the normal airplane to begin a critical stall to be instantly followed by a vicious spin before the airplane could take a new flight path to compensate for the increased drag created by said retarding or decelerating influence; such is not the condition when said retarding or decelerating influence is embodied as an improvement in my invention. A vicious spin always precludes a critical stall and since the wing mounted in the manner which shall be more fully described in the following paragraphs is not subject to stalling tendencies in any circumstances, sudden and indiscreet operation of said flaps will not cause undue peril to the occupants of the aircraft.

Another object is to eliminate the necessity of an aircraft pivoting on its wheels, when said aircraft is on the ground, so as to increase the angle of attack of the wings in order to fly off the ground. Said wheels on the conventional aircraft are located usually near the center of gravity, thereby inducing the airplane to "nose over" if the brakes are abruptly applied. With my invention the center of gravity may be located, with respect to the front and rear wheels, in a position to forestall any "nose over" tendencies, for it will not be necessary to pivot the airplane on its front or rear wheels to fly off the ground.

How the foregoing objects and advantages are secured, together with others which will occur to those skilled in the art, will be more apparent from the following description making reference to the accompanying drawings, in which—

Figure 2 is a side view of the airplane, a portion of the body being broken away to show the pilot operable controls and cooperating mechanism to the angle of glide regulators and rockable stabilizer on the tail of the airplane;

If the horizon and the relative wind were always on identical planes, or if there were no shifting of the plane of the relative wind with respect to the horizon, or if natural human reaction did not receive its sense of control from the attitude of the aircraft with respect to the horizon but naturally and unerringly responded to the direction of the relative wind when controlling the flight of an airplane, and if brakes, decelerators, drag augmenting devices, angle of glide regulators, flaps, or similar devices could be used with impunity without placing a premium on skill there would be no basic need for my invention.

A lifting airfoil has the peculiar property of suddenly losing its lift after reaching a maximum at an angle of attack of about 20 degrees, and said angle of attack has for its line of reference the direction of the relative wind, which in the course of flight is oblivious to the sight and sense of the pilot.

Controlled ascent and descent of an aircraft is negotiated by means of increasing and decreasing the lift of the wing; when more lift is created than is necessary to sustain level flight the aircraft takes an angular upward path; when less lift is created than is necessary to sustain level flight the aircraft takes an angular downward path. Said change in lift may be effected by varying the speed for any one constant angle of attack, or by varying the angle of attack for any one constant speed. In both mentioned instances a change in altitude occurs which can be sensed and thereby serving as a guide to the operator of the aircraft, always remaining the indeterminate factor is the relative wind and the angle of attack relative thereto which only indirectly, and sometimes mistakably, is registered by its effect, namely lift; a sudden loss of lift is sensed by the pilot to indicate that a greater angle of attack is necessary to create more lift, and after acting accordingly and much to his confusion the airplane not only continues to lose more lift but falls into a steep nose-dive spinning viciously out of control; he soon learns to his feeling of insecurity that the sudden loss of lift indicated an angle of attack beyond the maximum lift, and to correct such a condition it is necessary to intentionally nose-dive the airplane to regain proper control, regardless of the airplane's proximity to the ground. The pilot's attention is thus continually diverted from the control of the aircraft to that of anticipating a stall and suspecting the slightest irregularity.

Besides the dangerous stall the airplane, as it is commonly known, is seriously handicapped by still another critical limitation. Piloting said airplane is much like driving an automobile without brakes; if said airplane has acquired too much much speed or altitude, which is potential velocity, to land at the desired spot it is necessary to make another circuit and try again; in paralleling this incident in an automobile without brakes, it would be necessary for the driver to drive in a circuit until he developed enough skill to have the car stop rolling at the desired spot. My invention is not subject to this limitation as will be noted by those skilled in the art, nor is is susceptible to a critical stall as shall be illustrated by the following paragraphs.

In my invention, above referred to with the aid of the accompanying drawings, I have eliminated the hazard of stalling by the peculiar design of the wings 4; wherein the aerodynamic forces of each wing are balanced separately and independently of the fuselage, allowing each wing to seek separately its own relation to the relative wind, said aerodynamic forces imposing a limit on the maximum angle of attack beyond which the wing cannot be induced by the manually operated control-surface, thereby enabling the pilot to safely control the flight by sensing the variation in lift without fear of indirectly or directly inducing a stall by indiscreet control, or by inattention to the control of the aircraft.

Figures 1, 13, 14:
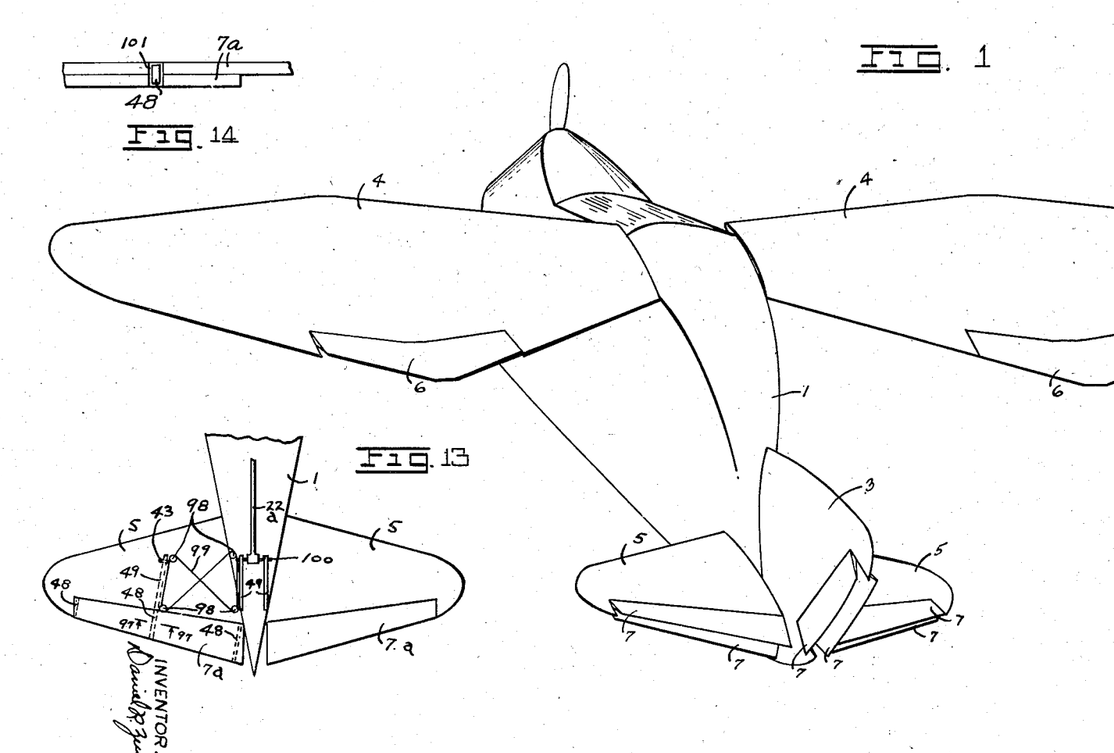
Figure 1 is a perspective view of the airplane, illustrating the general outline of the airplane, the pilot operable wing control-surfaces, and the pilot operable glide-angle regulators comprising oppositely actuating flaps on the tail of the airplane.
Figure 13 illustrates the modified form of glide-angle regulator, described in Figures 11 and 12, in reduced scale installed upon the tail of an airplane, and showing the modification necessary in the cooperating control mechanism to operate said modified form of glide-angle regulator.
Figure 14 is a sectional view taken on the line 97—97 in Figure 13 showing the wells which accommodate the supporting-arm, necessary to support the cooperating units of the modified glide-angle regulator described by Figures 11 and 12.

The drawing of Figure 1 illustrates an airplane of the monoplane type with wings 4 which taper in plan form, both toward the tips and toward the fuselage from the midpoint of the semi-span, with a control surface 6 integrally mounted in the trailing edge midway between the wing tip and fuselage 1, on the right and left wing respectively.

Figure 4:
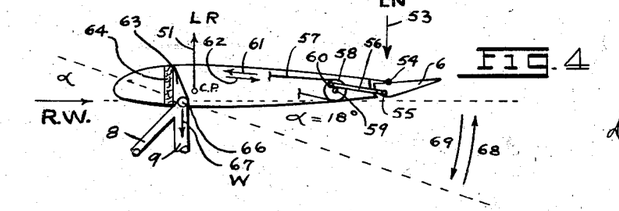
Figure 4 is a sectional view taken on the line 104—104 in Figure 3.

The wings 4 are swingably attached to the fuselage independently of each other by means of a shaft 95, said shaft passing laterally through the top of the fuselage and journalling into a housing 94 which is contained on the fuselage end of each wing 4, right and left respectively; and in mid semi-span each wing is hinged, by means of fitting 63 and bearing 66, to the vertex of the triangle formed by drag strut 8 and lift strut 9, whose base ends are fixedly attached to the lower portion of the fuselage. There are no mechanical connections to wings 4 for the purpose of guiding, limiting the movement, or manually turning said wings on their lateral axis $x$—$x$. The only obvious stops to limit the turning movement of each wing on lateral axis $x$—$x$ are structural limitations clearly indicated in Figure 4, showing the spar 84 as an obstruction to anti-clockwise rotation.

As shall be explained in the following paragraphs, limitations to the turning movement on lateral axis $x$—$x$ of each wing in both clockwise and anti-clockwise directions are imposed by aerodynamic forces with respect to the relative wind. The elastic chord 106 longitudinally disposed within the fuselage, having its elastic action properly directed to wings 4, right and left respectively, by means of guides 108, is attached to said wings by means of fitting 107, thereby bringing the said wings to a neutral position with respect to the fuselage 1 when aerodynamic action is non-existent, as when the air plane is at rest on the ground. The elastic action of elastic chord 106 is easily capable of overcoming the turning inertia of the wings 4 but said elastic action is easily overcome by the aerodynamic forces imposed upon the wings 4.

Figures 5, 6, 7:
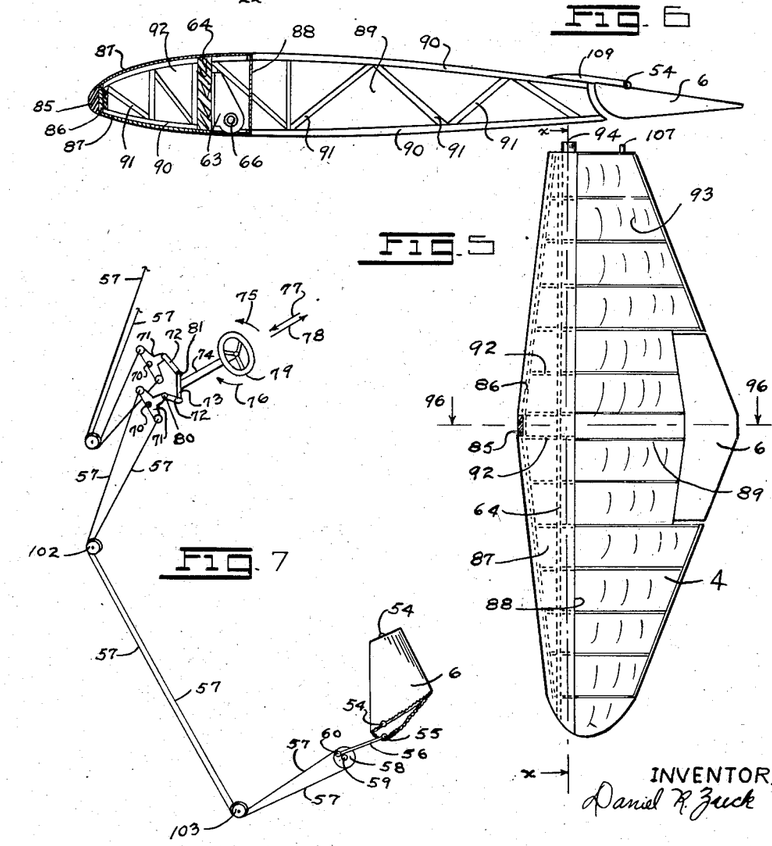
Figure 5 is a top view of the left wing illustrating the unique planform and design of the wing structure.
Figure 6 is an enlarged sectional view taken on the line 96—96 of Figure 5 showing the disposition of the wing structure and counter-balance.
Figure 7 is a perspective view of the pilot operable control wheel and the cooperating mechanism to the wing control-surface.

The wing 4 illustrated in Figure 5 and Figure 6 is a unique structure designed for the purpose of disposing the center of gravity of said wing on or near the lateral pitching axis x—x. Said wing structure is comprised of a single spar 64 of the conventional type, laterally disposed foreward of the lateral pitching axis x—x, designed to resist the normal bending forces; a leading edge spar 86, laterally disposed foreward of the main spar 64 conforming to the plan form of the leading edge, designed to resist the drag loads and torsional moment imposed upon said wing; ribs built in two sections, trailing edge 89 and leading edge 92, disposed on a plane normal to the spar and spaced laterally within the plan form of the wing, said ribs consisting of upper and lower cap strips 90 and interconnecting structural members 91; a covering 87 on the upper and lower surface of the leading edge to a distance arrears of the laterally disposed spar 64, designed to resist torsion and shear stresses imposed upon said wing by the lift and drag loads respectively; a laterally disposed false spar 88, sectionally installed between the laterally spaced trailing edge ribs 89, designed to equalize the torsion stresses of opposite direction imposed by the upper and lower surface respectively, said false spar 88 completing an efficient torsion resisting cell which can be symbolized by the capital letter D; suitable hinge fittings 109 to swingably support control-surface 6; a fabric covering suitably doped to envelope the entire wing structure; a counter-balance 85 consisting of lead or similar substance disposed in the leading edge to place the center of gravity of the wing 4 in its entirety on or near the lateral pitching axis x—x.

Control-surfaces 6 on the respective wings 4 are operated by the pilot, simultaneously in the same direction by moving the control wheel 79 as indicated by arrows 77 and 78, by means of the cooperating mechanism shown in Figure 7; said control-surfaces 6 are operated in opposite directions when the control wheel 79 is rotated as indicated by arrows 75 and 76.

The cooperating mechanism to control-surfaces 6 comprises a pilot operable control wheel 79, fixedly attached to a shaft 74 suitably installed in a bearing 84 to allow fore and aft movement as indicated by arrows 78 and 77, and rotational movement as indicated by arrows 75 and 76, said bearing 84 being fixedly secured to the cockpit structure 82; to the end of shaft 74 opposite the wheel 79 are outwardly extending two arms 73 directly opposed to each other and at right angles to the shaft 74; to the ends of said arms 73 are universally connected link rods 72 upwardly extending and universally connecting to the rearwardly and upwardly extending arms of rockable T members 71, the universal connections being indicated by 80 and 81 respectively; said rockable T members 71 are swingably and individually supported on short shafts 70 suitably housed in bearings not shown; to the opposite ends of each said rockable T member 71 are suitably attached the free ends of a steel control cable 57, which by means of suitably supported pulleys 102 and 103 is guided into the wings around a larger pulley 58, said steel cable thus transmits rotational movement to the larger pulley 58, which is suitably supported by bearing 59; said rotational movement of pulley 58 is transmitted to control-surface 6 by means of link rod 56, with suitable bearings 55 and 60 being contained at each end of said link rod.

Thus by means of a separate steel cable 57 and its cooperating mechanism to each wing 4 simultaneous movement of control surfaces 6 in the same direction, and simultaneous movement in opposite directions is facilitated respectively by fore and aft movement and rotational movement of the pilot operable control wheel 79.

Figures 3, 4A, 12:
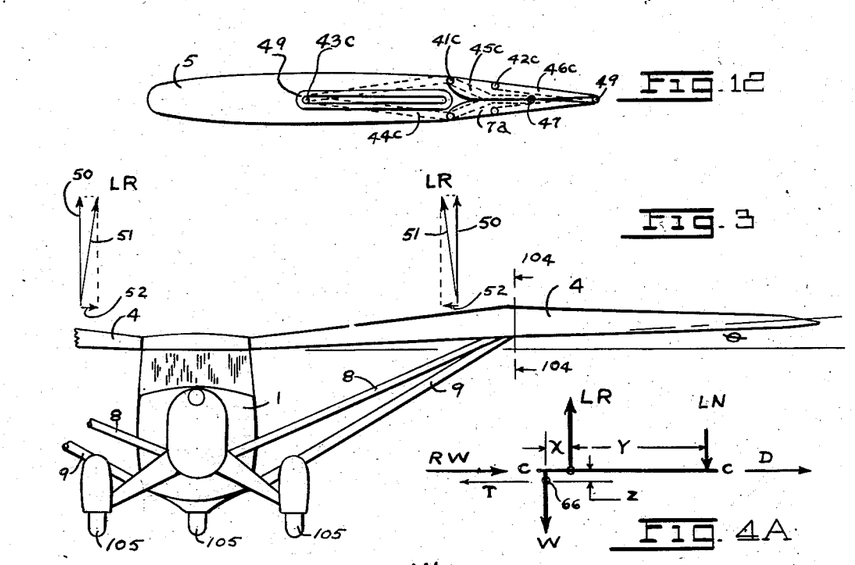
Figure 3 is a fragmental front view of the airplane, illustrating a force diagram for each wing on a span-wise plane of the wing.
Figure 4A is a force diagram on a plane parallel to the wing chord and through the lateral pitching axis $x$—$x$.
Figure 12 is the modified form of glide-angle regulator in the fully closed position, the broken lines indicating the position of the cooperating units.

The force diagram, Figure 4A, illustrates an equation of moments, summation of moments about LR is equal to zero, $Wx-LNy-Dz-Tz=0$; W symbolizes the weight of the airplane; LR is the theoretical resultant of the positive lift forces; LN is the theoretical line of action of the negative lift forces, created and regulated by the pilot operable control-surface 6; Rw is the relative wind perpendicular to LR and W, and is the reference line for determining the angular relation of C—C, said C—C symbolizing the chord of the airfoil; $x$, $y$, and $z$ are respective distances of the applied forces from the axis of rotation 66.

LR, 51, in Figure 3 is angularly disposed to the fuselage at an angle equal to $\theta$ for the reason of the combination gull-wing and dihedral; 50 and 52 are the vertical and horizontal components of force respectively of the resultant LR, 51, said vertical and horizontal components of force varying directly as the magnitude of LR; a difference in magnitude LR, 51, between the right and left wings 4 causes an unbalanced relation between the respective vertical and horizontal components, thereby causing a rolling motion and directional displacement of the airplane; when no unbalanced relation exists between said respective force components 50 and 52 of each wing 4, there is no rolling motion or directional displacement of the airplane, said airplane will then continue in a straight line with respect to the plane of the longitudinal and lateral axis, movement in a vertical plane (ascending and descending) being obtained by equally varying the force components 50 of each of the respective wings 4.

The wings 4 with control-surfaces 6 designed and installed on the fuselage 1 as herein disclosed are not subject to stalling tendencies for several reasons, the most obvious reason being an effective reduction of the angle of attack of that portion of each wing 4 forward of the control surface 6, said angle of attack being effectively reduced by the upturned control-surface 6, thereby preventing a complete stall and sudden falling off of the maximum lift; another reason obvious to those skilled in the art is that a highly tapered lifting airfoil stalls progressively from the shorter chords toward the longer chords, and thereby gives the control-surface the benefit of the unstalled portion of the wing; still another reason is that a control surface becomes inactive when functioning in the wake of a stalled airfoil, therefore control-surface 6 loses its power to exert its influence beyond the angle of complete stalling of the wings 4; thus irrespective of the position of the pilot operable control-surface 6 beyond a certain upwardly pivoted position, wings 4 seek an unstalled relation with the relative wind, thereby safely allowing the control of the aircraft to be based on the sense of lift which is a prime indication of the direction of flight.

Figure 8:
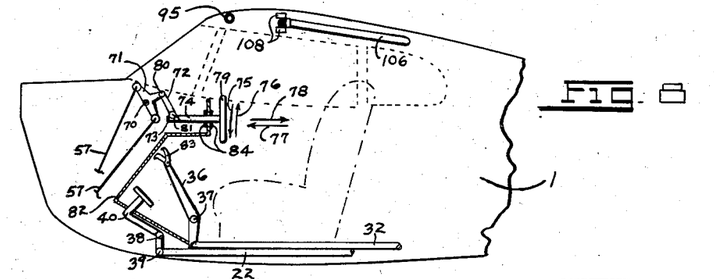
Figure 8 is an enlarged fragmental section of the fuselage illustrating the pilot operable controls associated with my invention.

In Figure 2 and Figure 8 are disclosed two pilot-operable controls, the freely movable foot pedal 40 and the hand lever 36. Said hand lever 36 is termed as a stabilizer adjustment, and is capable of being moved to, and maintained in any predetermined position within said lever's operating range by means of a spring loaded trip, said trip not being shown but is actuated by actuating trip lever 83. Hand lever 36, by means of a cooperating mechanism, actuates the rockable horizontal stabilizer 5 to trim the attitude of the fuselage with respect to the path of flight; if the fuselage 1 is tail heavy said stabilizer 5 is given an increased angle of attack to raise the tail thereby giving the fuselage the desired angular position with respect to the path of flight, no further adjustment then being necessary unless the pilot may desire to have the fuselage level with respect to the horizon when making the steep descents which are possible with the operation of the glide-angle regulators 7. Said fuselage 1 may thus, by means of stabilizer 5 and cooperating mechanism to the pilot-operable lever 36, be rotated to any selected angular attitude without influencing the flight path of the airplane.

The external tail surfaces on the tail of the airplane comprise substantially a fixedly secured vertical fin 3 and a rockably attached horizontal stabilizer 5. Said stabilizer 5, in two sections right and left respectively, is rockably attached to the fuselage 1 by means of the tubular spar ends 26 being journaled in respective fittings 27 which are fixedly secured to said fuselage; and outwardly extending from the bottom of the fuselage are struts 10 and 11 which by a suitable fitting not shown support the rockable stabilizer 5 near the tips in its role of controlled rotation on a lateral axis.

From the leading edge of each respective stabilizer section 5 is inwardly extended a leading edge spar 20, to which is swingably secured a link 21, the opposite end of which is hinged to a rearwardly extending arm of bell crank 31; said bell crank 31 is rockably supported by shaft 30 suitably secured in a bearing housing not shown. To the downwardly extending arm of bell crank 31 is connected a link rod 32 whose opposite end connects to the downwardly extended arm of actuating hand lever 36, said actuating hand lever 36 being suitably hinged on bearing 37.

Figure 9:
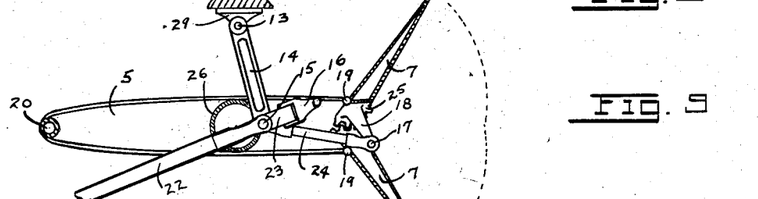
Figure 9 is an enlarged detail view of the horizontal stabilizer showing the glide-angle regulator in the two-thirds of full open position, also showing the cooperating units in operating the same.
Figure 10:
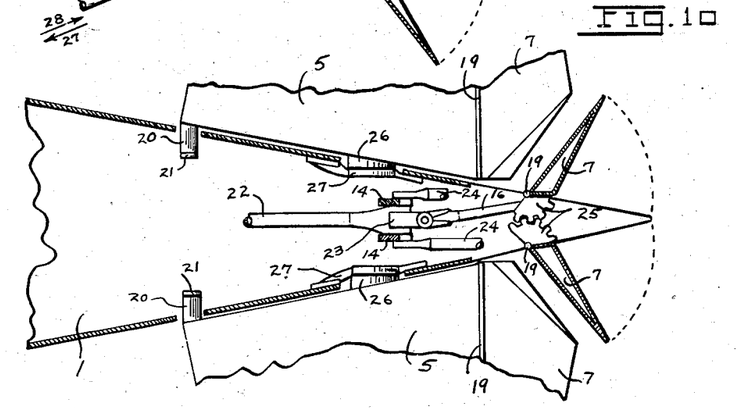
Figure 10 is an enlarged sectional view taken on the line 12—12 of Figure 2, and showing the glide-angle regulator on the vertical fin in the two thirds of full open position together with the cooperating units in operating said glide-angle regulator.

On the fixedly secured vertical fin 3 and the rockably attached horizontal stabilizer 5 are integrally contained oppositely actuating flaps 7, said flaps 7 comprising a portion of the trailing edge divided into two sections oppositely supported by respective hinges 19. A sectional portion of a gear 25 fixedly secured to each respective flap 7 is in mesh with a sectional gear portion of the oppositely actuating flap. Each set of oppositely actuating flaps has an arm 18 extending outwardly and away from one of the sectional gears 25, to which is hinged a link rod 24 for the flaps of the horizontal stabilizer 5, and link rod 16 for the flaps on the vertical fin. Said link rod 16 is hinged to a universal link 23 to allow motion in two planes. The downwardly extending link 14 is hinged at 13 to the fixedly secured fitting 29. Said link 14 serves as a guide to direct the movement of link rod 22. 13,15, and 17 are bolts which retain the respective mechanisms in assembly. The above said link rod 22 is connected at its forward end to the longitudinally disposed link rod 65 and the downwardly extended link 34 which is hinged at 33, said link 34 serving to guide the movements of link rods 65 and 22. The foreward end of link rod 65 is connected at 39 to the downwardly extended arm of the foot pedal 40. Said foot pedal 40 is hinged at 38 and rotatably actuated by the pressure of the pilot's foot. At the junction of link rods 65, 22, and 34 is connected a wire spring 35, which creates an elastic force opposing the pressure of the pilot's foot, thereby serving to close the oppositely actuating flaps 7, or glide-angle regulators as they numerously have been referred to, to permit a streamlined and unobstructed flow of air over the stabilizer 5.

Figure 11:
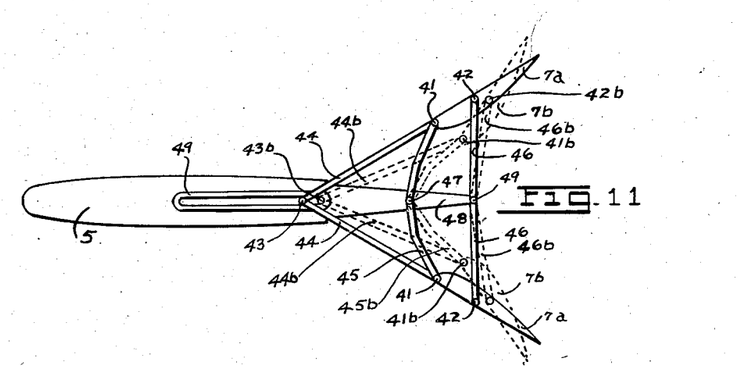
Figure 11 is a modified form of the glide-angle regulator, a form permitting a wider range of glide angle control by reason of its greater effectiveness as a drag increasing device, the broken lines indicating the glide-angle regulator and cooperating units in full open position and the solid lines showing said glide-angle regulator in about the 90 percent of full open position.

The modified form of glide-angle regulators 7a illustrated in Figures 11 and 12 are capable of creating a larger drag than are those described in the previous paragraphs as flaps 7. The said glide-angle regulators 7a, which shall also be referred to interchangeably as flaps for convenience, are capable of producing greater drag per unit flap area than flaps 7 for several obvious reasons: First, due to their nature of operation they disturb a larger projected area of air, and thus said flaps 7a change the flow of a greater volume of air; and second said flaps function as lifting airfoils opposing each other, thus building up a tremendously high pressure area forward of the flaps 7a and a correspondingly low pressure area aft of said flaps.

The operation of flaps 7a is effected by a slideable shaft 43 in a rack 49. To said shaft 43 are attached two links 44, one connecting to the upper flaps 7a at 41 and the other connecting to the lower flap 7a at 41. The flap 7a is supported on two axes of rotation, 41 and 42, by links 45 and 46, said links 45 and 46 being hinged respectively at 47 and 49 to an outwardly extended arm 48 from the stabilizer 5. Fore and aft movement of shaft 43 as indicated at 43b and 43c illustrates the position of shaft 43 in the fully opened and fully closed position respectively of flaps 7a. Numbers with the letter b attached, as 46b, indicate the position of the cooperating units of flaps 7a when said flaps are fully opened, and numbers with the letter c attached, as 46c, indicate the position of the cooperating units of flaps 7a when said flaps are fully closed. 43, 41, and 47 describe the vertices of a triangle with a variable base 43—47 effected by the shaft 43 sliding in the rack 49. As flap 7a is connected to the vertex of said triangle at 41 a sympathetic movement is given to link 46; said link in turn induces a turning motion in said flap 7a. Thus flap 7a is given a rotational movement about axis 41 as said flap moves vertically and longitudinally with respect to the stabilizer 5.

In Figure 13 the modified flaps 7a are illustrated installed upon an airplane. A slight modification in the cooperating mechanism to the pilot operable foot pedal 40 is necessary to operate said flaps 7a. The rearwardly extending fitting of link rod 22 is modified as 22a with a shaft 100 projecting at right angles through the aperture of said fitting, and into the adjacent racks 49 paralleling said link rod 22a. An endless steel cable 99 is supported in a crossed circuit by four pulleys 98 suitably secured in their respective positions as is indicated in Figure 13. Shafts 43 and 100 are securely attached to cable 91 when said shafts are in the maximum forward position of their respective racks 49. Thus, motion transmitted by the pilot operable foot pedal 40 to link 22a produces a sliding motion of shaft 43, which as previously described with the aid of Figure 11 and Figure 12 operates flaps 7a. In Figure 14 are shown accommodating wells 101 in the flaps 7a for the supporting arm 48, thereby enabling said flaps to close flush to form a streamlined stabilizer.

The accompanying table herewith included, is a mathematical illustration of how effectively an airplane embodying my invention may vary its angle of glide for any predetermined velocity and angle of attack. At 88 miles per hour at an angle of attack (reference line is relative wind) of 4 degrees the normal glide angle is 10.7 degrees; with the glide-angle regulators opened 33%, as given in column a, the glide angle is changed to 18.4 degrees with no change in velocity; with said glide-angle regulators opened 66% the glide angle is changed to 24.2 degrees with no change in velocity, as is given in column b; with said glide-angle regulators opened 100% the glide angle is changed to 26.7 degrees with no change in velocity, as is given in column c.

In the table referred to above it is noted that similar variations in the glide angle can be effected throughout the range of glide velocities. Any greater or less range of glide angle regulation can be designed into an airplane by providing the proper amount of effective flap area to produce the desired results. The figures given in the table are based on an airplane embodying glide-angle regulators of the type 7, and not 7a which per same unit of flap area would correspondingly increase the range of glide angle control.

As mentioned numerous times, the direction of the relative wind is the reference line in determining the angle of attack. Previously I have illustrated how the wings of an airplane embodying my invention would never in any circumstances increase their angle of attack beyond the maximum lift coefficient (maximum lift). I shall now illustrate how it will be impossible to decrease the angle of attack of wings 4 beyond any predetermined set minimum angle with respect to the relative wind. Said minimum angle of attack shall be governed by limiting the clockwise movement of control-surface 6; this may be accomplished by giving link rod 56 the proper length as can be observed by said link rod's connection to pulley 58 at the bearing 60.

In my airplane I have limited the clockwise movement of control-surface 6 to a position to maintain the wing at a minimum angle of attack of 4 degrees. In referring to the table it will be noted that at 4 degrees angle of attack the airplane has a normal gliding velocity of 88 miles per hour, which is the maximum power of velocity that can be obtained. At said velocity the normal glide angle is 10.7 degrees which can be increased to 26.7 degrees without any change in velocity by operating the glide-angle regulators 7. The said airplane is permitted to make such a change in gliding angles without changing the angle of attack of wings 4 for the reason that the pilot operable control-surfaces 6 always, in all circumstances, automatically maintain the respective wings 4 in their proper angle of attack.

Figure 15:
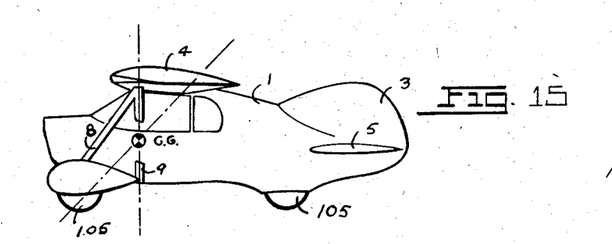
Figure 15 shows the advantageous location of the front portion of the undercarriage or landing gear with respect to the center of gravity.

Since wings 4 automatically pivot on a lateral axis, it is not necessary to place the front or rear wheels 105 near the center of gravity, as is commonly done, to allow the airpane to pivot bodily on said wheels to increase the angle of attack for taking off. Thus by placing the wheels 105 well forward, said airplane is not in danger of being nosed over by the application of the brakes on wheels 105, nor is this hazard likely to be realized if said wheels meet an obstruction.

An airplane embodying my invention as herein described is a simple and safe airplane in which to introduce the novice to flying, and it will be recognized by those skilled in the art as the long awaited "private owner" type of airplane. Said airplane's operation is made very simple by the elimination of the usual rudder pedals, retaining only the simple wheel control 79 and a single foot pedal 40; said foot pedal 40 is only used in landing to vary the gliding angle, which may be compared to a foot brake pedal in an automobile, as it is used to jockey the airplane to the desired landing spot just as the foot brake pedal is used to stop an automobile at the desired place.

On taking off with said airplane the control wheel 79 may be pulled completely back, or held in any position necessary to climb the airplane, without fear of stalling. The only imperative duty, as in level flight, is to retain the airplane level laterally. When the desired altitude has been attained the control wheel 79 is eased forward until the airplane no longer climbs bodily, which in my airplane is all the way forward, for said airplane cruises at 4 degrees angle of attack which is the minimum angle of attack that wings 4 are allowed to assume. In turning the airplane to the right or left the control wheel 79 is rotated to the right or left respectively and the airplane takes a corresponding curvilinear path with the proper amount of bank, neither skidding nor slipping in said path. And in landing said airplane the power is turned off at any altitude within reach of the landing field, and since said airplane can neither be stalled nor dived all attention can be directed toward jockeying the airplane to the desired landing spot by means of the glide-angle regulators 7. Upon alighting the brakes to the wheel may be fully applied without any danger of nosing over, and when aerodynamic action on wings 4 ceases the elastic chord 106 restores said wings to a neutral angular position with respect to the fuselage. Said airplane, then, in taxiing will not react bodily to guests of wind which are frequently encountered on the ground.

Many variations may be effected without departing from the spirit of my invention. For example: An airplane may embody all the features of my invention except the glide-angle regulators 7, 7a, employing only the wing features; or the features of my wing as herein disclosed may be used without the dihedral or gull-wing effect for directional control; or an autogiro or rotating wing type aircraft may embody the glide regulators 7, or 7a, without employing the wings as herein disclosed; or the modified glide regulators 7a may be used on the "fixed wing" type airplane installed in the trailing of the main lifting wings inboard from the ailerons. Said glide regulator 7a installed in the wing of the fixed wing type aircraft as described would be especially valuable to military aircraft for dive bombing. Operation of said glide regulators may be modified so that each flap (upper or lower) of flaps 7a will operate individually or simultaneously. Thus allowing the lower flap to open while the upper flap remains closed, thereby effecting a high lift "Fowler flap" of the type disclosed by an earlier patentee to facilitate the take off and landing of fixed wing type aircraft. Individual operation of flaps 7a, upper and lower respectively, may be effected by individually operated shafts 43 in respective racks 49 for each of the respective said flaps. It is to be understood that these, together with other variations in details, are anticipated by the appended claims.

Table

| Angle of attack α | M. P. H. V. | Normal glide angle | (a) | (b) | (c) |
|---|---|---|---|---|---|
| | | Degrees | Degrees | Degrees | Degrees |
| 0 | 167.0 | 37.6 | 56.2 | 63.1 | 65.7 |
| 2 | 115.0 | 17.9 | 30.9 | 38.0 | 41.2 |
| 4 | 88.0 | 10.7 | 18.4 | 24.2 | 26.7 |
| 6 | 75.0 | 8.9 | 15.6 | 19.0 | 20.9 |
| 8 | 65.4 | 7.6 | 12.2 | 15.3 | 17.8 |
| 10 | 60.0 | 7.2 | 11.2 | 14.3 | 15.1 |
| 12 | 54.4 | 6.9 | 10.8 | 12.4 | 13.4 |
| 14 | 51.0 | 7.1 | 9.9 | 11.8 | 12.8 |
| 16 | 48.0 | 7.2 | 9.8 | 11.5 | 12.4 |
| 18 | 45.8 | 7.4 | 9.8 | 11.3 | 12.1 |

What I claim is:

1. An airplane in which directional control of flight on vertical, longitudinal and lateral axes is exclusively attained without use of a tail rudder or elevator comprising a fuselage, cambered wings mounted on the fuselage for free rotation on a lateral axis slightly forward of the center of lifting pressure and devoid of direct pilot control, flight control members pivotally mounted in the wings within the cross sectional form of the same and comprising a part of said cross sectional form, and manually controlled means to selectively move both said flight control members either in the same or relatively opposite angular directions to vary the aerodynamic negative lift forces of the members and thus alter the angle of attack of the respective wings.

2. In an airplane, the combination of: a fuselage, a fixed vertical tail fin, a substantially fixed horizontal stabilizer, cambered wings mounted on the fuselage for free rotation on a lateral axis slightly forward of the center of lifting pressure and devoid of direct pilot control, flight control members pivotally mounted in the wings within the cross sectional form of the same, and comprising a part of said cross sectional form, and manually controlled means to selectively move both said flight control members either in the same or relatively opposite angular directions to vary the aerodynamic negative lift forces of the members and thus alter the angle of attack of the respective wings.

3. An airplane in which directional control of flight on vertical, longitudinal and lateral axes is exclusively attained without use of a tail rudder or elevator comprising a fuselage, cambered wings mounted on the fuselage for free rotation on a lateral axis slightly forward of the center of lifting pressure and devoid of direct pilot control, flight control members pivotally mounted in the wings within the cross sectional form of the same and comprising a part of said cross sectional form, and manually controlled means to selectively move both said flight control members either in the same or relatively opposite angular directions to vary the aerodynamic negative lift forces of the members and thus alter the angle of attack of the respective wings, the control members being so mounted that their minimum negative lift position is within the normal aerodynamic profile of the wings.

4. An airplane in which directional control of flight on vertical, longitudinal and lateral axes is exclusively attained without use of a tail-rudder or elevator comprising a fuselage, cambered wings mounted on the fuselage for free rotation on a lateral axis slightly forward of the center of lifting pressure and devoid of direct pilot control, flight control members pivotally mounted in the wings within the cross sectional form of the same and comprising a part of said cross sectional form, and manually controlled means to selectively move both said flight control members either in the same or relatively opposite angular directions to vary the aerodynamic negative lift forces of the members and thus alter the angle of attack of the respective wings, the control members being so mounted that their minimum negative lift position is within the normal aerodynamic profile of the wings and the wings are so balanced that they assume at minimum an angle of attack under influence of aerodynamic force sufficient for normal flight.

5. An airplane comprising a fuselage, sustaining cambered airfoils, means separately mounting such airfoils on said fuselage for free rotation on axes lying substantially in a vertical later plane passing through the center of gravity of the airplane in normal flight and forwardly of the center of lifting pressure of said airfoils, said airfoils having no direct pilot mechanical connections for guiding, limiting the movement, or turning the airfoils on their said axes, control surfaces pivotally mounted on said airfoils aft of the center of lifting pressure, and pilot flight controls to commonly or selectively pivot the control surfaces as the flight control elements.

6. In an airplane, the combination of: a fuselage, a fixed vertical tail fin, a substantially fixed horizontal stabilizer, cambered wings mounted on the fuselage for free rotation on a lateral axis forward of the center of lifting pressure and substantially at the center of gravity of the airplane in normal flight and devoid of direct pilot control, flight control members pivotally mounted on the wings, and manually controlled means to selectively move both said flight control members either in the same or relatively opposite angular directions to vary the aerodynamic negative lift forces of the members and thus alter the angle of attack of the respective wings.

7. An airplane in which directional control of flight on vertical, longitudinal and lateral axes is exclusively attained without use of a tail rudder or elevator comprising a fuselage, cambered wings mounted on the fuselage for free rotation on a lateral axis slightly forward of the center of lifting pressure and substantially at the center of gravity of the airplane in normal flight and devoid of direct pilot control, flight control members pivotally mounted on the wings, and manually controlled means to selectively move both said flight control members either in the same or relatively opposite angular directions to vary the aerodynamic negative lift forces of the members and thus alter the angle of attack of the respective wings, the wings being so balanced in relation to the control members that they assume at minimum an angle of attack under influence of aerodynamic force sufficient for sustaining flight and to prevent nose dive and at maximum an angle of attack insufficient to produce a stall.

8. An airplane comprising a fuselage, sustaining cambered airfoils mounted on the fuselage forward of their center of lifting pressure and free to rotate on their lateral axes, said axes being positioned with their point of pivotation substantially at the center of gravity of the airplane, said wings being statically balanced so that the center of gravity of the wings is substantially at the point of pivot when the airplane is stationary, said wings being devoid of direct pilot control, control surfaces pivotally mounted on the wings aft of the center of lifting pressure, and flight controls to commonly or selectively pivot the control surfaces.

9. An airplane in which directional control of flight on vertical, longitudinal and lateral axes is exclusively attained without use of a tail rudder or elevator comprising a fuselage, cambered wings mounted on the fuselage for free rotation on a lateral axis slightly forward of the center of lifting pressure and devoid of direct pilot control, flight control members pivotally mounted on the wings within the cross sectional form of the same and comprising a part of said cross sectional form, manually controlled means to selectively move both said flight control members either in the same or relatively opposite angular directions to vary the aerodynamic negative lift forces of the members and thus alter the angle of attack of the respective wings, and pilot controlled flaps mounted independently of the wings to effect a drag variable and thereby vary the glide path angle of the airplane.

10. An airplane in which directional control of flight on vertical, longitudinal and lateral axes is exclusively attained without use of a tail rudder or elevator comprising a fuselage, cambered wings mounted on the fuselage for free rotation on a lateral axis forward of the center of lifting pressure and substantially at the center of gravity of the airplane in normal flight and devoid of direct pilot control, flight control members pivotally mounted on the wings, manually controlled means to selectively move both said flight control members either in the same or relatively opposite angular directions to vary the aerodynamic negative lift forces of the members and thus alter the angle of attack of the respective wings, and pilot controlled flaps mounted independently of the wings to effect a drag variable and thereby vary the glide path angle of the airplane.

11. An airplane comprising a fuselage, sustaining cambered airfoils separately mounted on the fuselage forward of the center of lifting pressure and free to rotate on their lateral axes, said wings having no pilot controlled mechanical connections for guiding, limiting the movement, or turning the wings on their lateral axes, said axes being mounted on the fuselage with their point of pivotation substantially at the center of gravity of the airplane, control surfaces pivotally mounted on the wings aft of the center of lifting pressure, pilot flight controls to commonly or selectively pivot the control surfaces, and pilot controlled flaps mounted independently of the wings to effect a drag variable and thereby vary the glide path angle of the airplane.

12. An airplane comprising a fuselage, sustaining cambered airfoils mounted on the fuselage forward of their center of lifting pressure and free to rotate on their lateral axes, said axes being positioned with their point of pivotation substantially at the center of gravity of the airplane, and being statically balanced so that the center of gravity of the wings is substantially at the point of pivot when the airplane is stationary, said wings being devoid of direct pilot control, control surfaces pivotally mounted on the wings aft of the center of lifting pressure, flight controls to commonly or selectively pivot the control surfaces, and pilot controlled flaps mounted independently of the wings to effect a drag variable and thereby vary the glide path angle of the airplane.

13. An airplane comprising a fuselage, sustaining cambered airfoils, means separably mounting such airfoils on said fuselage for free rotation on axes lying substantially in a vertical lateral plane passing through the center of gravity of the airplane in normal flight and forwardly of the center of lifting pressure of said airfoils, said airfoils having no direct pilot mechanical connections for guiding, limiting the movement, or turning the airfoils on their said axes, control surfaces pivotally mounted on said airfoils aft of the center of lifting pressure, and pilot flight controls to commonly or selectively pivot the control surfaces as the flight control elements, the pivotal mounting for said control surfaces and the operative range of said flight controls being so related that said control surfaces are confined to movement within an arc irrespective of pilot control which will insure at minimum an angle of attack of said airfoils sufficient to prevent nose dives and at maximum an angle of attack insufficient to produce a stall.

DANIEL R. ZUCK.